US011072385B2

(12) United States Patent
Munksø

(10) Patent No.: US 11,072,385 B2
(45) Date of Patent: Jul. 27, 2021

(54) BICYCLE FRAME WITH BUILT-IN AND REMOVABLE BATTERY

(71) Applicant: Lynx ApS, Silkeborg (DK)

(72) Inventor: Lars Munksø, Silkeborg (DK)

(73) Assignee: Lynx Aps, Silkeborg (DK)

( * ) Notice: Subject to any disclaimer, the term of this patent is extended or adjusted under 35 U.S.C. 154(b) by 320 days.

(21) Appl. No.: 16/080,341

(22) PCT Filed: Feb. 27, 2017

(86) PCT No.: PCT/DK2017/050053
§ 371 (c)(1),
(2) Date: Aug. 28, 2018

(87) PCT Pub. No.: WO2017/148483
PCT Pub. Date: Sep. 8, 2017

(65) Prior Publication Data
US 2019/0009855 A1    Jan. 10, 2019

(30) Foreign Application Priority Data
Feb. 29, 2016    (DK) .......................... PA 2016 70116

(51) Int. Cl.
*B62K 19/40*    (2006.01)
*B62M 6/90*    (2010.01)
(Continued)

(52) U.S. Cl.
CPC ............ *B62K 19/40* (2013.01); *B21C 23/085* (2013.01); *B62J 99/00* (2013.01); *B62M 6/90* (2013.01);
(Continued)

(58) Field of Classification Search
CPC ............ B62K 19/40; B62M 6/90; B62J 45/00
See application file for complete search history.

(56) References Cited

U.S. PATENT DOCUMENTS

| | | | |
|---|---|---|---|
| 4,437,679 | A | 3/1984 | Campagnolo |
| 5,221,102 | A | 6/1993 | Spangler |

(Continued)

FOREIGN PATENT DOCUMENTS

| | | | |
|---|---|---|---|
| CN | 202320650 U | 7/2012 | |
| CN | 103523133 A | 1/2014 | |

(Continued)

OTHER PUBLICATIONS

Alpha Aluminium—God, bedre, bedst.
Educational Materials from Industry.

*Primary Examiner* — Kevin Hurley
*Assistant Examiner* — Michael R Stabley
(74) *Attorney, Agent, or Firm* — James Creighton Wray

(57) ABSTRACT

Method for the producing of an extruded frame element with battery pack profile for use in a bicycle frame comprising a plurality of frame elements, where the frame elements are interconnected and constitute a structure with such great rigidity that the bicycle frame under ordinary loading does not change its geometrical shape, wherein the at least one frame element is extruded with variable material thicknesses in a given cross sectional profile, and a recess is made in the at least one extruded frame element, as well as a bicycle frame comprising such a frame element, wherein a stable bicycle frame with sufficient strength is achieved, and wherein the bicycle frame becomes as discreet as possible.

6 Claims, 6 Drawing Sheets

(51) Int. Cl.
  *B62J 45/00* (2020.01)
  *B21C 23/08* (2006.01)
  *B62J 99/00* (2020.01)
  *B29C 48/12* (2019.01)
  *B29L 31/30* (2006.01)
  *B62J 6/00* (2020.01)

(52) U.S. Cl.
  CPC ....... *B29C 48/12* (2019.02); *B29L 2031/3091* (2013.01); *B62J 6/00* (2013.01); *B62J 45/00* (2020.02)

(56) References Cited

U.S. PATENT DOCUMENTS

| | | | |
|---|---|---|---|
| 5,825,899 A | 10/1998 | Yamaguchi | |
| 5,842,711 A | 12/1998 | Legerot | |
| 7,393,125 B1 * | 7/2008 | Lai | B62K 19/30 |
| | | | 362/473 |
| 8,727,367 B2 * | 5/2014 | Talavasek | B62K 19/30 |
| | | | 280/281.1 |
| 8,979,110 B2 * | 3/2015 | Talavasek | B62M 6/90 |
| | | | 280/279 |
| 9,580,140 B2 * | 2/2017 | Talavasek | B62K 3/02 |
| 9,580,141 B2 * | 2/2017 | Talavasek | B62M 6/40 |
| 9,611,003 B1 * | 4/2017 | Yu | B62M 6/90 |
| 9,950,602 B2 * | 4/2018 | Duan | B62M 6/90 |
| 2010/0237585 A1 * | 9/2010 | Binggeli | B62M 6/90 |
| | | | 280/288.4 |
| 2013/0241170 A1 | 9/2013 | Talavasek | |
| 2014/0329134 A1 | 11/2014 | Lang | |

FOREIGN PATENT DOCUMENTS

| | | |
|---|---|---|
| CN | 203381746 U | 1/2014 |
| CN | 105015680 A | 11/2015 |
| DE | 4315084 A1 | 11/1994 |
| DE | 19712326 A1 | 10/1998 |
| DE | 202008009933 U1 | 9/2008 |
| DE | 202014007474 U1 | 9/2015 |
| DK | 176497 B1 | 5/2008 |
| EP | 0686522 A2 | 12/1995 |
| EP | 11982909 A1 | 10/2008 |
| EP | 2287065 A1 | 2/2011 |
| EP | 2572970 A1 | 3/2013 |
| EP | 2653371 A1 | 10/2013 |
| EP | 3118096 A1 | 1/2017 |
| FR | 2636294 A1 | 3/1990 |
| FR | 2665678 A1 | 2/1992 |
| JP | 2000302074 A | 10/2000 |
| JP | 2003341579 A | 12/2003 |
| JP | 2006123683 A | 5/2006 |
| JP | 2009006842 A | 1/2009 |
| WO | 9919201 A1 | 4/1999 |
| WO | 2005057069 A1 | 6/2005 |
| WO | 2008106976 A1 | 9/2008 |

\* cited by examiner

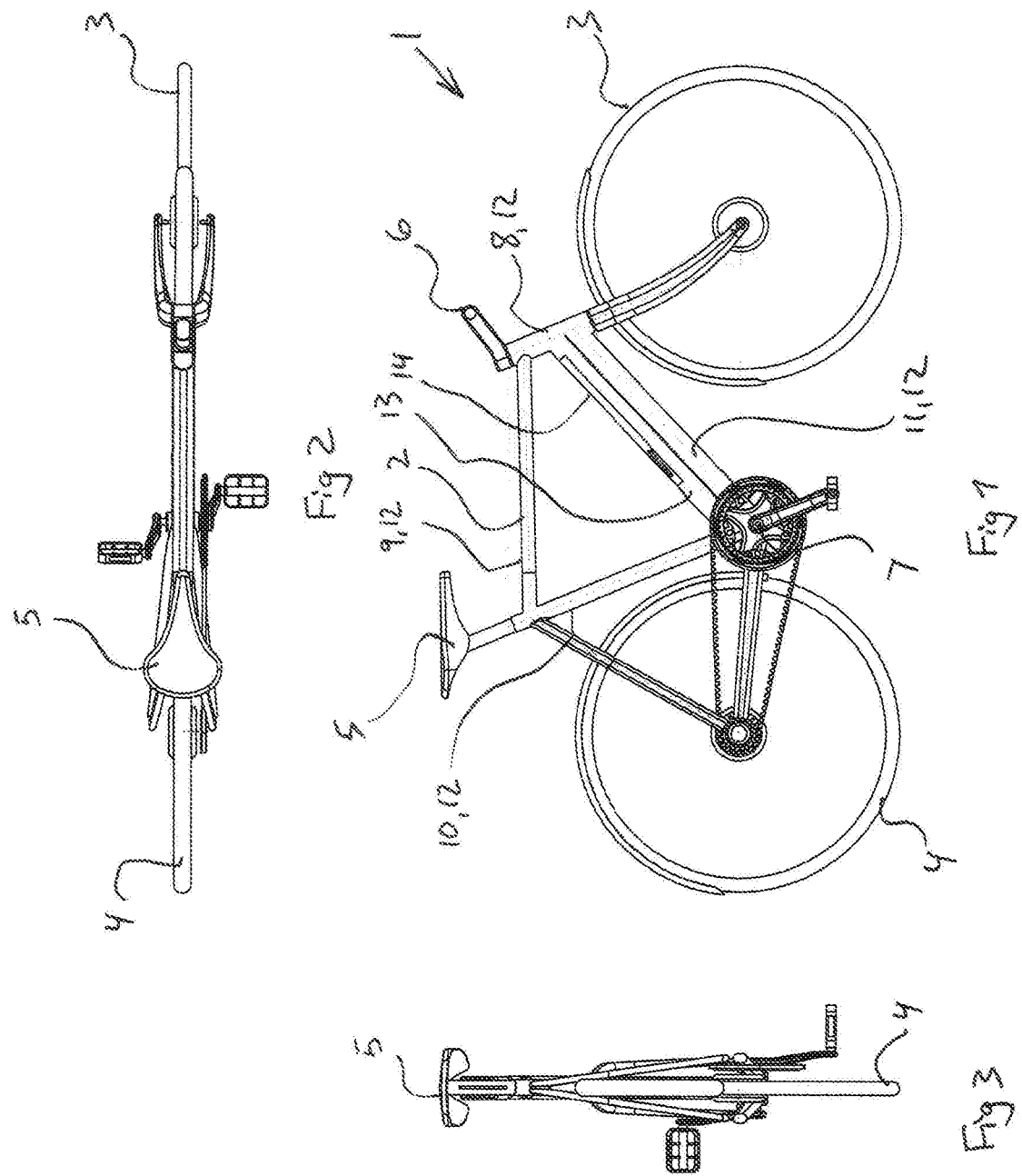

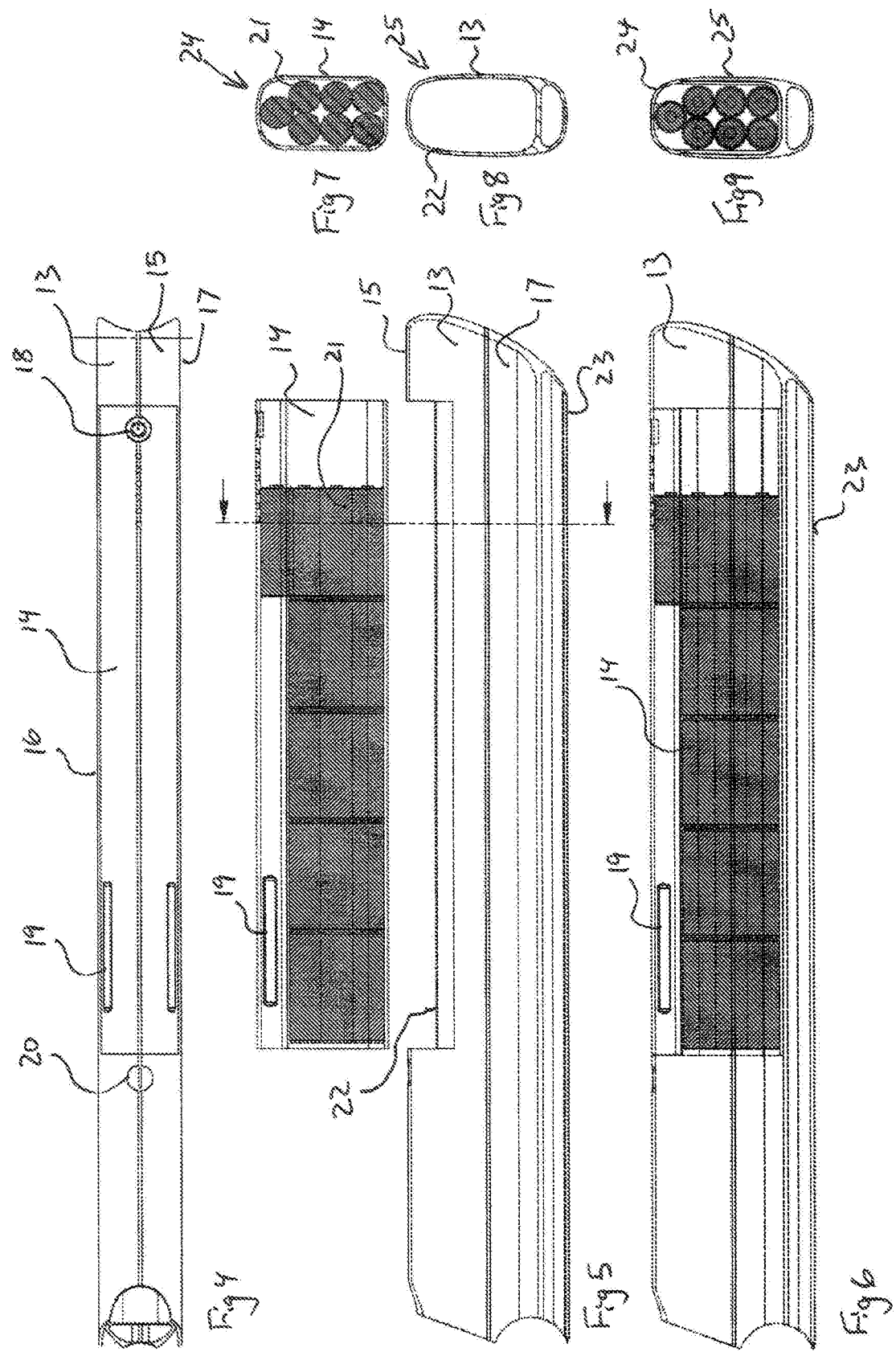

BICYCLE FRAME WITH BUILT-IN AND REMOVABLE BATTERY

This application claims the benefit of Danish Application No. PA 2016 70116 filed Feb. 29, 2016 and PCT/DK2017/050053 filed Feb. 27, 2017, International Publication No. WO 2017/148483 A1, which are hereby incorporated by reference in their entirety as if fully set forth herein.

FIELD OF THE INVENTION

The present invention concerns a method of producing an extruded frame element with battery pack profile for use in a bicycle frame comprising a plurality of frame elements, where the frame elements are interconnected and constitute a structure with such great rigidity that the bicycle frame under ordinary loading does not change its geometrical shape.

The present invention further concerns a bicycle frame comprising a plurality of frame elements, including at least one frame element, where the frame elements are interconnected and constitute a structure with such great rigidity that the bicycle frame under ordinary loading does not change its geometrical shape, where there is embedded in the frame at least partly an electrical battery system comprising at least one battery pack for storage of electrical energy for use in connection with equipment, such as comfort equipment and/or safety equipment on a bicycle, including an auxiliary electric motor.

BACKGROUND OF THE INVENTION

It is generally known how to use batteries in connection with bicycles, for example to be used for the power supply of lights. Likewise, it is generally known how to use battery systems in bicycles to be used for the power supply of auxiliary electric motors.

Bicycles with auxiliary electric motors thus have a battery system with at least one battery pack which is mounted somewhere on the bicycle. Formerly, it was customary to place the battery pack underneath or in connection with the luggage rack, or in connection with the seat, but in more recent models of so-called electric bicycles or e-bicycles the battery packs are built-in or assembled in the actual bicycle frame, so that an e-bicycle is not so easily identifiable.

The problem with battery packs is that they need to be charged and since it is impractical to bring the entire bicycle to a power supply source, such as a plug receptacle, it is therefore necessary to be able to remove the bicycle's battery pack.

For the above reasons, it is also well known to make recesses in bicycle frames, thereby making room for battery packs, yet with the drawback that the recess causes a substantial weakening of the structure of a traditional bicycle frame.

However, the aforementioned problem can be solved, for example, as indicated in DK 176497 B1, from which there is known a bicycle frame, comprising a plurality of frame elements, preferably tubes, where the frame elements are interconnected and constitute a structure with such great rigidity that the bicycle frame under ordinary loading does not change its geometrical shape, where the portion of the frame which is designed to mount a battery pack is comprised of a multichamber profile, where at least one chamber in the multichamber frame is intact. In this way, one achieves a bicycle frame with a recess for a battery pack, wherein the frame has great rigidity.

Likewise, it is known how to install a rectangular profile in a round tube and thereby also create a profile in which there are several chambers and thus an increased strength.

Purpose of the Invention

The purpose of this invention is to solve the problems of stability of bicycle frames in a much better, faster, and cheaper way than the prior art by not using multichamber profiles to achieve a sufficient strength, yet at the same time to solve the problems such that the bicycle frame becomes as discreet as possible.

Thus, the purpose of this invention is to create a much better, faster and cheaper solution, wherein it is not necessary to weld various structures together in order to form, for example, a bottom tube which can have an opening for the battery pack.

It is furthermore the purpose of the invention for the finished profile to be extruded in the production process with variable material thicknesses, wherein for example one part of the profile has a greater material thickness than other parts, according to which is needed in order to achieve a sufficient strength. The production process also has the purpose of making a recess which is carefully adapted to the at least one battery pack.

It is likewise the purpose of the invention to extrude the battery pack in a form which means that the bicycle frame in which the battery pack is installed appears as a "solid cast" optical unit. Thus, this means that the battery pack does not appear as a foreign element, but rather is part of the overall aesthetic design of the bicycle, and the battery pack does not appear as an extra part of the bicycle.

Finally, the purpose of the invention is to indicate a bicycle frame with built-in and removable battery, wherein the battery is primarily installed in a place from which it can easily be removed for charging, replacement, or theft prevention.

Specification of the Invention

According to a first aspect of the invention, the above-mentioned purpose is achieved by a method as described in the introduction and as described in the preamble of claim 1, involving a method for the producing of an extruded frame element with battery pack profile for use in a bicycle frame comprising a plurality of frame elements, where the frame elements are interconnected and constitute a structure with such great rigidity that the bicycle frame under ordinary loading does not change its geometrical shape, wherein the at least one frame element is extruded with variable material thicknesses in a given cross sectional profile.

This makes it possible to achieve the desired and necessary strength at the different places of a frame element in order to make the frame element stable enough. In particular, there can be an especially adapted material thickness and thus an increased rigidity in the profile on the sides of the frame element.

The actual extruding of the frame element can be done by using a long series of materials, such as aluminum, stainless steel, other metals and alloys, as well as a long series of plastic types or polymers. A frame element can also be produced by casting or pultrusion, and it can be made from fiber-reinforced plastics, for example.

The present invention in a second aspect also concerns a method in which a recess is made in the at least one extruded frame element.

This makes it possible to achieve an opening in the extruded frame element adapted to the portion of a battery pack that will be part of the bicycle frame. The recess in one preferred embodiment can be placed in the top of the extruded frame element or elements, but it can also be placed alternatively in many other ways.

The present invention in a third aspect also concerns a method in which the at least one battery pack profile is extruded.

The actual extruding of the battery pack profile can likewise be done by using a long series of materials, such as aluminum, stainless steel, other metals and alloys, as well as a long series of plastic types or polymers.

This likewise makes it easy, quick, practical and economical to make a profile suitable for the batteries used, and wherein the profile is furthermore adapted to the extruded frame element.

In one preferred embodiment, the battery pack's profile is made of the same material as the frame element. For example, if this material is aluminum, the battery and the frame can both be anodized in different colors, both in regard to a good design and in regard to an increased crack resistance of the material and the surface.

In one embodiment the profile is likewise extruded with variable material thicknesses, either extending from the profile, for example in the bottom, or extending into the profile, which likewise increases the strength and stability of the bicycle frame.

The present invention in a fourth aspect also concerns a method in which the at least one battery pack profile is installed in the at least one extruded frame element's recess.

This makes it possible to achieve a discreet bicycle frame containing at least one battery pack.

The present invention in a fifth aspect also concerns a bicycle frame, where the frame comprises at least one extruded frame element with varying material thicknesses comprising a top, a bottom, a first side and a second side, an inner side and an outer side and at least one recess with at least one battery pack comprising a cross sectional profile with a first part and a second part, and where the first part of the at least one battery pack together with the frame element's cross sectional profile in the recess is complementary to the frame element's cross sectional profile before the recess.

This makes it possible to place at least one battery pack on a bicycle such that the battery pack does not stand out as an extra mounted and independent unit, but instead the battery appears very discreetly as an integral part of the bicycle frame.

By extruding the frame element, it is furthermore made possible to lay down material on the frame element where it might be appropriate to achieve sufficient strength in order to compensate for the at least one recess for the at least one battery pack.

Thus, the recess makes it possible to install the battery pack in the frame element itself, where the sides in one preferred embodiment are braced against and support the sides of the battery pack.

The extruded profile of the frame in one preferred embodiment is oval, round, or a combination thereof. This means that the higher the sides of the frame element in the recess, the smaller the battery becomes in order to fit into the recess. In one preferred embodiment, however, the sides of the frame element extend over so large a portion of the battery that the center of gravity of the battery makes the battery lie securely in the recess of the frame element.

The extruded frame element with the recess in one preferred embodiment is furthermore placed on the portion of the bicycle frame extending from the bottom bracket to the head tube, namely in the lower tube, but in theory it can also be placed on other parts of the bicycle frame, for example on the portion extending from the bottom bracket to the saddle, namely in the saddle tube, yet a placement in the upper tube is also a possibility.

In another preferred embodiment, the first part of the battery pack's profile is of the same external size and shape as the frame element—and thus it fits precisely in the recess, so that the frame with the battery pack will be viewed as an unbroken tube both visually and also purely in terms of strength. Namely, the battery profile will be able to transmit compression forces in the event that the frame element is subjected to bending, since the profile of the battery pack will replace the profile of the frame. This will be the case regardless of whether the frame element alone is strong enough not to be deformed without the battery pack being installed.

It is understood that a bicycle frame as described likewise involves means of interconnecting the battery pack to the electrical components on the bicycle, such as lights, capacity indicator, and auxiliary motor by means of contacts, terminals, connectors, cables, etc.

It is furthermore understood that there are of course means of fastening the battery pack in the frame element such that the battery pack does not drop off the bicycle or fall out of the recess.

The present invention in a sixth aspect also concerns a bicycle frame, wherein the at least one extruded frame element comprises an indentation at the bottom of the frame element's inner side, and wherein the second part of the at least one battery pack comprises a protrusion, the indentation and the protrusion being complementary.

This makes it possible to place the at least one battery pack more quickly and securely in the frame element's recess.

The present invention in a seventh aspect also concerns a bicycle frame, wherein the at least one extruded frame element has its greatest material thickness in the bottom, and wherein the first side and second side have a greater material thickness than the top.

This makes it possible to adjust the necessary strength relations in the frame element, so that one can compensate for less material thickness in one place in the element by adding material to other selected places of the frame element.

The present invention in an eighth aspect also concerns a bicycle frame, wherein the at least one extruded frame element furthermore comprises a channel on the outer side.

This makes it possible to lead cables and/or wires and brake tubes in the entire or part of the length of the frame, wherein the cables are easily accessible and thus can be service and replaced easily and quickly as desired or needed. At the same time, one accomplishes a quicker and less complicated assembly of the bicycle during its manufacture.

In one preferred embodiment, the channel is provided with fastening arrangements for cables and wires.

The present invention in a ninth aspect also concerns a bicycle frame, wherein the channel comprises a closure arrangement, where the outer channel and the closure arrangement have mating closure devices.

This makes it possible to close the channel with the aid of a lid, a rail, or the like, which can be fastened for example by means of clips to the outer channel on the bicycle frame. The mentioned clips can be an integrated part of the lid itself and in one variant they can be made of the as the lid, as will appear from the description of the drawing and the figures.

The advantage of this is to protect the cables and wires etc. against dirt and to give a pleasing design appearance to a closed frame element, containing both the battery and the necessary electrical components. A further advantage is that the cables are more quickly installed and at the same time much easier to reach, should a repair become necessary. It is thus easier to service when cables are not laid in tubes, as is normal, but instead are easily accessible by removing the lid, for example, which is fastened to the channel by clips.

The present invention in a tenth aspect also concerns a bicycle frame, wherein the at least one battery pack comprises a cross sectional profile with an outer shape whose first part is visible and whose second part is hidden when the battery pack is set into the frame element's recess.

This makes it possible to construct a bicycle frame where the visible part of the battery pack constitutes a natural and discreet part of the entire bicycle frame in the cross section of the bicycle frame where the battery pack is positioned.

The batteries themselves can be any possible batteries which are available, such as 24 Volt or 36 Volt rechargeable lithium ion (Li-Ion) batteries/dry cells.

DESCRIPTION OF DRAWINGS

FIG. 1 shows a bicycle seen from the side,
FIG. 2 shows a bicycle seen from above,
FIG. 3 shows a bicycle seen from behind,
FIG. 4 shows an extruded frame element with battery pack, seen from the top of the frame element,
FIG. 5 shows a battery pack which is lifted up from the frame element, seen from the second side of the frame element,
FIG. 6 shows a battery pack inserted into the frame element, seen from the second side of the frame element,
FIG. 7 shows a battery pack's cross sectional profile in a first embodiment,
FIG. 8 shows a frame element's cross sectional profile in a first embodiment,
FIG. 9 shows such a battery pack's cross sectional profile inserted into the frame element's cross sectional profile in a first embodiment.

LIST OF REFERENCE NUMBERS

Figure 10:
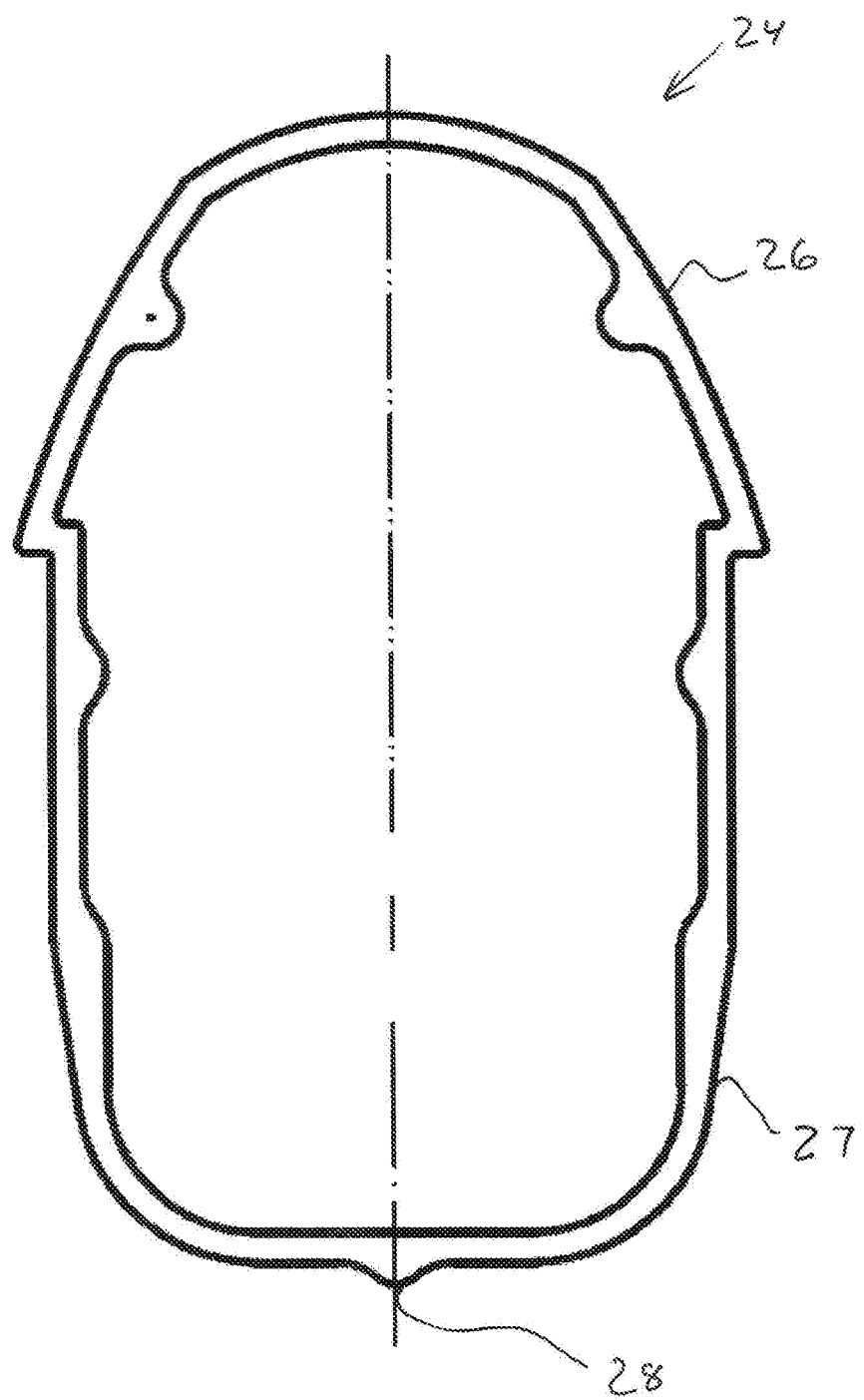
FIG. 10 shows a battery pack's cross sectional profile in a second embodiment.

1 Bicycle
2 Bicycle frame
3 Front wheel
4 Rear wheel
5 Saddle
6 Handlebars
7 Bottom bracket
8 Head tube
9 Upper tube
10 Saddle tube
11 Slanting tube/lower tube
12 Frame element
13 Extruded frame element
14 Battery pack
15 Top, extruded frame element
16 First side, extruded frame element
17 Second side, extruded frame element
18 On/off switch
19 Gripping device
20 Lock
21 Batteries
22 Recess
23 Bottom, extruded frame element
24 Cross sectional profile, battery pack
25 Cross sectional profile, extruded frame element
26 First part, battery pack
27 Second part, battery pack
28 Protrusion, battery pack
29 Inner side, extruded frame element
30 Indentation, extruded frame element
31 Outer side, extruded frame element
32 Channel, extruded frame element
33 Closure arrangement
34 Lugs
35 Mating closure devices

DETAILED SPECIFICATION OF THE INVENTION

FIG. 1 shows a bicycle 1 seen from the side, where the bicycle 1 has among other things a bicycle frame 2, a front wheel 3, a rear wheel 4, a saddle 5, handlebars 6, a bottom bracket 7 and a head tube 8. The bicycle frame 2 is shown here with an upper tube 9, a saddle tube 10 and a slanting tube/lower tube 11, which constitute frame elements 12 that can all be extruded.

In FIG. 1, the bicycle frame 2 has besides the slanting tube 11 also an extruded frame element 13 with a battery pack 14. The extruded frame element 13 along can constitute the slanting tube 11, but it can also be reinforced by an additional frame element 12, as shown in the figure.

FIG. 2 shows a bicycle 1 seen from above, and FIG. 3 shows a bicycle 1 seen from behind.

FIG. 4 shows an extruded frame element 13 with battery pack 14 seen from the top 15 of the extruded frame element, where a first side 16 and a second side 17 are also shown. Furthermore, there is an on/off switch 18 for activation of the battery pack 14 and a gripping device 19 for use when handling the battery pack 14. Finally, there is shown a lock 20 for securing the battery pack 14 in the extruded frame element 13.

FIG. 5 shows the extruded frame element 13 seen from the second side 17, where the battery pack 14 with batteries 21 is lifted out of the extruded frame element 13, showing a recess 22 in the extruded frame element 13. The recess 22 here is shown in the top 15 opposite the bottom 23 of the extruded frame element 13.

FIG. 6 likewise shows the extruded frame element 13 seen from the second side 17, where the battery pack 14 with batteries 21 is now inserted into the extruded frame element 13, so that the extruded frame element 13 with the battery pack 14 appears as a single unit, the battery pack 14 being integrated in the extruded frame element 13.

FIG. 7 shows a battery pack's cross sectional profile 24 with inserted batteries 21, while FIG. 8 shows a frame element's cross sectional profile 25, in which there is a recess 22, and FIG. 9 shows such a battery pack's cross sectional profile 24 inserted into the frame element's cross sectional profile 25.

FIG. 10 shows a battery pack's cross sectional profile 24 in a second embodiment with a first part 26, which will be visible when the battery pack 14 is inserted into an extruded frame element's recess 22, and with a second part 27, which will be hidden when the battery pack 14 is inserted into an extruded frame element's recess 22. The figure likewise shows a protrusion 28 situated on the outside of the second part 27.

Figure 11:
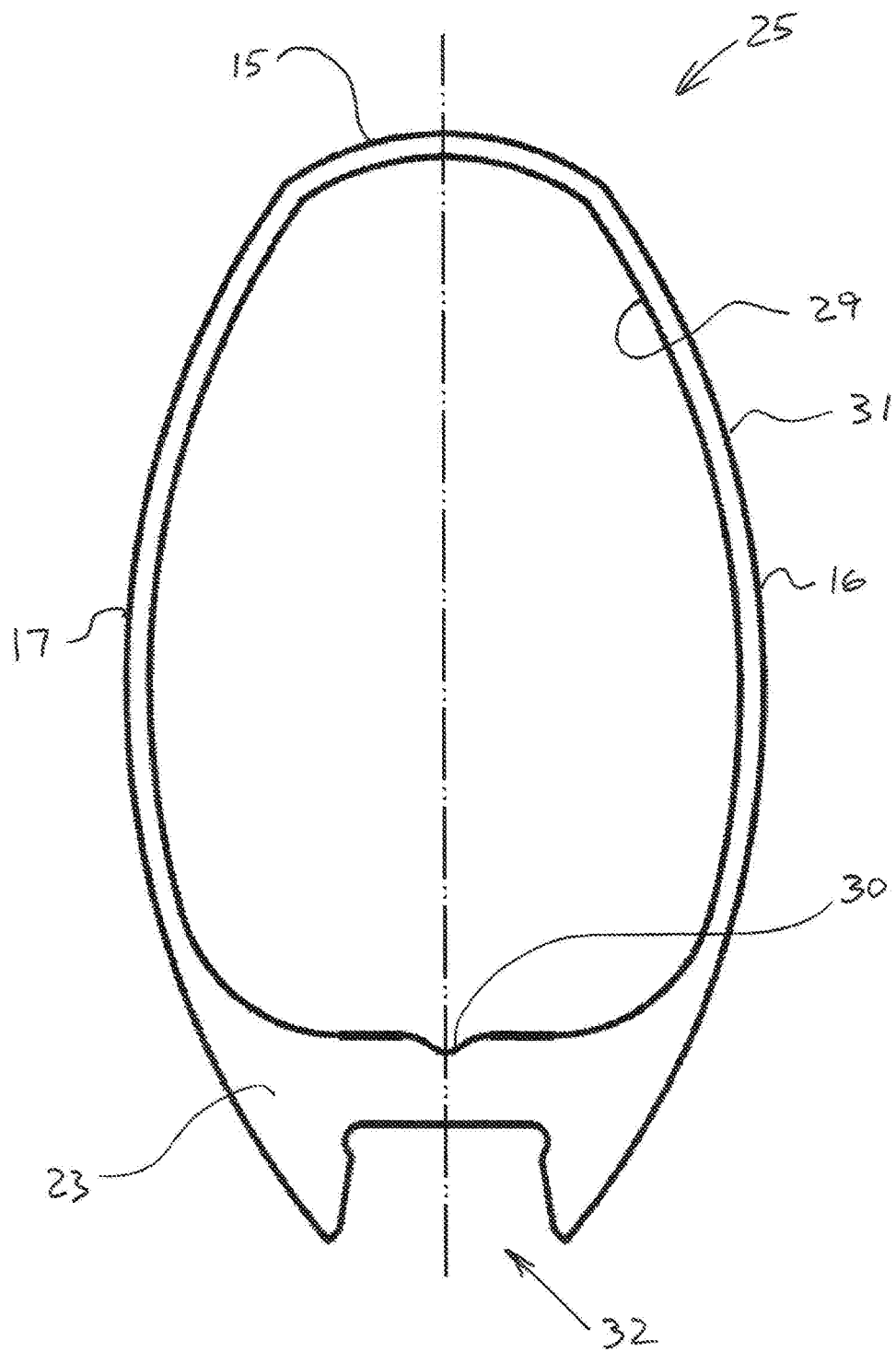
FIG. 11 shows a frame element's cross sectional profile in a second embodiment.
Figure 12:
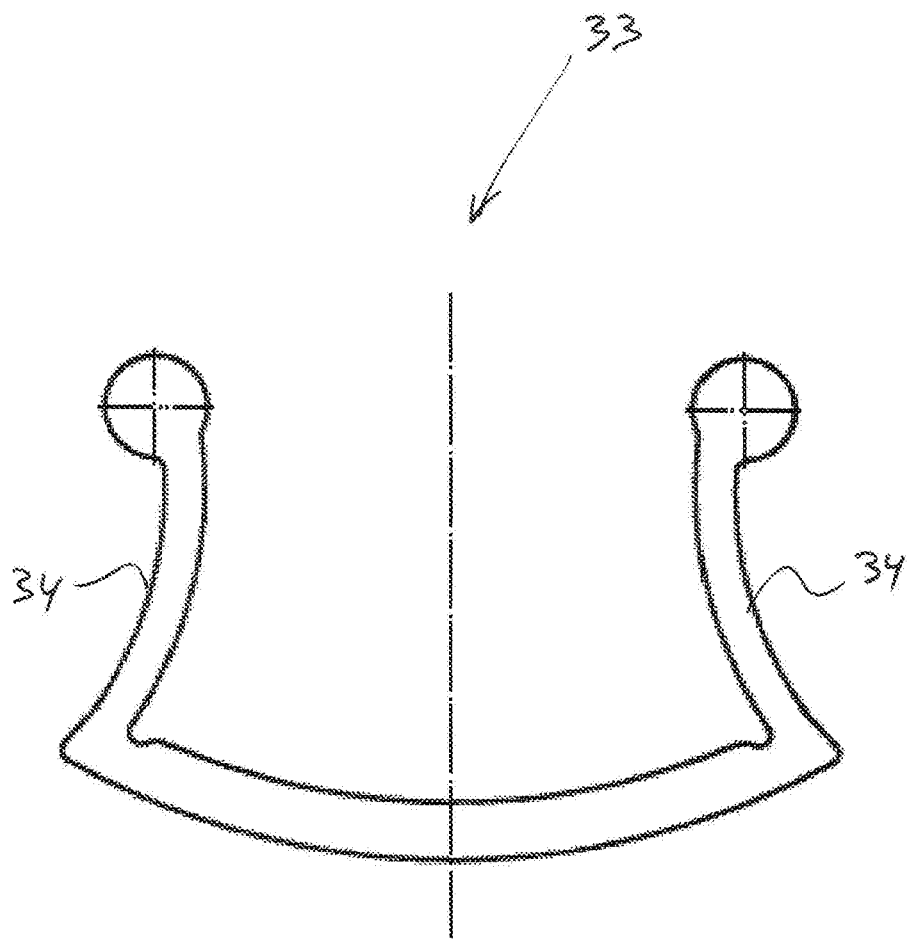
FIG. 12 shows a closure arrangement.

FIG. 11 shows a frame element's cross sectional profile 25 in a second embodiment, with a top 15, a first side 16, a second side 17 and a bottom 23. Moreover, the figure shows that the extruded frame element 13 has an inner side 29, where there is an indentation 30 in the bottom 23 and where the extruded frame element 13 has an outer side 31, where there is a channel 32 in the bottom 23. FIG. 12 shows a closure arrangement 33 with two lugs 34 for closing the channel 32, where the closure arrangement itself has a built-in clip function for its fastening in the channel 32.

Figure 13:
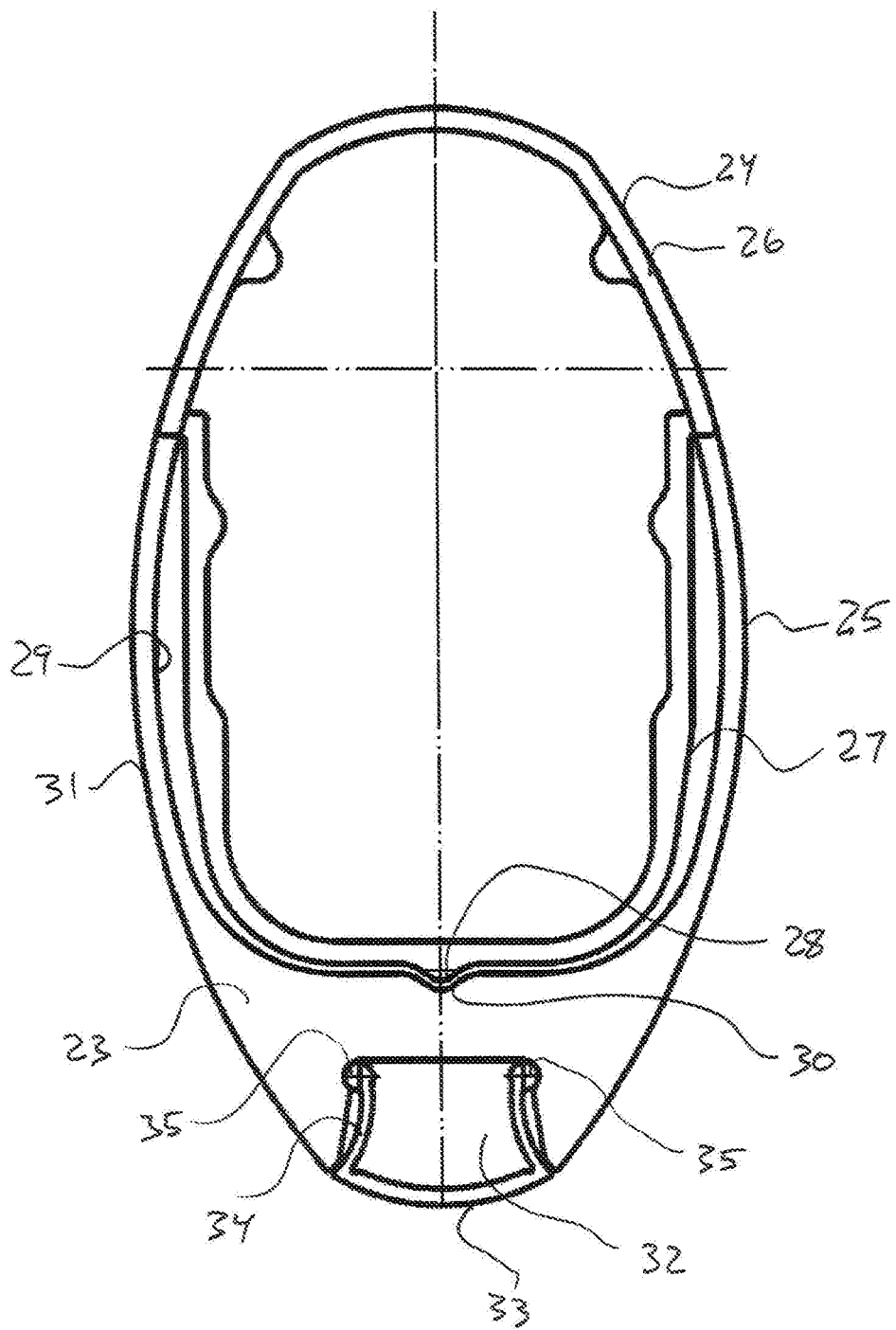
FIG. 13 shows a battery pack's cross sectional profile inserted into the frame element's cross sectional profile in a second embodiment.

FIG. 13 shows a battery pack's cross sectional profile 24 inserted into the frame element's cross sectional profile 25, where the battery pack's protrusion 28 engages with the frame element's indentation 30 and where the closure arrangement 33 closes the channel 32 by means of mating closing devices 35 of the channel and the closure arrangement. In this figure one clearly notices that there is room for a variable material thickness on the inner side 29 in the frame element—in fact the material thickness can be increased in certain locations by several millimeters, without affecting the external shape. Precisely by increasing the material thickness on the first side 16, and the second side 17, one can achieve an increased rigidity in the frame element itself, if this should prove to be required in order to achieve a sufficient rigidity in a given frame structure.

The invention claimed is:

1. Method for producing of an extruded bicycle frame element of a bicycle frame, where said extruded bicycle frame element comprises a separate battery pack profile, said bicycle frame comprising a plurality of frame elements, where the frame elements are interconnected and constitute a structure with such great rigidity that the bicycle frame under ordinary loading does not change its geometrical shape, wherein the at least one frame element is extruded with variable material thicknesses in a given cross section of the profile and wherein the frame element is not a multi-chamber profile and where said frame element comprises a top, a bottom, a first and a second side and where the bottom has greater material thickness than the first side and second side along the entire bottom, and wherein the first side and second side have a greater material thickness than the top, and providing a recess in the at least one extruded frame element adapted to receive a portion of the battery pack profile and extruding at least one battery pack profile with a cross sectional profile with a first part and a second part, and where the first part of the at least one battery pack together with the frame element's cross sectional profile in the recess is complementary to the frame element's cross sectional profile before the recess, wherein two side extensions extend downwardly from the bottom, thereby forming a channel on an outer side of the extended frame element, and the two side extensions have greater material thickness than the first side and second side.

2. Method for producing of an extruded frame element according to claim 1,
wherein the at least one battery pack profile is installed in the at least one extruded frame element's recess.

3. Bicycle frame, comprising a plurality of frame elements, including at least one frame element obtainable by the method according to claim 1.

4. Bicycle frame according to claim 3, wherein the at least one extruded frame element comprises an indentation at the bottom of the frame element's inner side, and wherein the second part of the at least one battery pack comprises a protrusion, the indentation and the protrusion being complementary.

5. Bicycle frame according to claim 3, wherein the channel comprises a closure arrangement, where the outer channel and the closure arrangement have mating closure devices.

6. Bicycle frame according to claim 3, wherein the at least one battery pack comprises a cross sectional profile with an outer shape whose first part is visible and whose second part is hidden when the battery pack is set into the frame element's recess.

* * * * *